(12) United States Patent
Lu et al.

(10) Patent No.: US 7,872,726 B2
(45) Date of Patent: Jan. 18, 2011

(54) ACTIVE DEVICE ARRAY MOTHER SUBSTRATE

(75) Inventors: Chun-Huang Lu, Taipei (TW); Yi-Ting Chiu, Taoyuan County (TW); Hsiu-Chih Tseng, Taoyuan County (TW); Chun-Ying Huang, Taoyuan County (TW); Hsiao-Sheng Chen, Taoyuan County (TW)

(73) Assignee: Chunghwa Picture Tubes, Ltd., Taoyuan (TW)

( * ) Notice: Subject to any disclaimer, the term of this patent is extended or adjusted under 35 U.S.C. 154(b) by 170 days.

(21) Appl. No.: 12/242,936

(22) Filed: Oct. 1, 2008

(65) Prior Publication Data
US 2009/0225269 A1 Sep. 10, 2009

(30) Foreign Application Priority Data
Mar. 7, 2008 (TW) .............................. 97108070 A

(51) Int. Cl.
*G02F 1/1333* (2006.01)
(52) U.S. Cl. ..................... 349/158; 349/73; 349/74; 349/142; 349/149
(58) Field of Classification Search .............. 349/158, 349/142, 143, 149, 147, 139, 56, 75, 74
See application file for complete search history.

(56) References Cited

U.S. PATENT DOCUMENTS

| 7,436,480 | B2 * | 10/2008 | Kang et al. | 349/149 |
| 2005/0253978 | A1 * | 11/2005 | Chae et al. | 349/43 |
| 2006/0033857 | A1 * | 2/2006 | Kim et al. | 349/54 |
| 2008/0111132 | A1 * | 5/2008 | Wang | 257/59 |
| 2009/0223269 | A1 * | 9/2009 | Huang | 72/250 |

FOREIGN PATENT DOCUMENTS

| JP | 11068110 | 3/1999 |
| TW | 200732742 | 9/2007 |

* cited by examiner

*Primary Examiner*—Brian M Healy
(74) *Attorney, Agent, or Firm*—Jianq Chyun IP Office

(57) ABSTRACT

An active device array mother substrate including a substrate, a plurality of active device arrays, a plurality of common bus lines, at least one first transparent conductive pattern layer, and at least one second transparent conductive pattern layer is provided. The substrate has a plurality of predetermined areas, and the active device arrays are respectively disposed in the predetermined areas. The common bus lines are respectively disposed in the predetermined areas to surround the active device arrays. The first transparent conductive pattern layer is connected or coupled between adjacent two common bus lines. The second transparent conductive pattern layer is extended to the adjacent predetermined area to be connected or coupled to the adjacent common bus line.

10 Claims, 3 Drawing Sheets

ACTIVE DEVICE ARRAY MOTHER SUBSTRATE

CROSS-REFERENCE TO RELATED APPLICATION

This application claims the priority benefit of Taiwan application serial no. 97108070, filed on Mar. 7, 2008. The entirety of the above-mentioned patent application is hereby incorporated by reference herein and made a part of this specification.

BACKGROUND OF THE INVENTION

1. Field of the Invention

The present invention generally relates to an active device array mother substrate, and more particularly, to an active device array mother substrate with electro static discharge (ESD) protection function.

2. Description of Related Art

During the manufacturing process of liquid crystal displays (LCDs), static electricity may be carried by operators, machines, or testing instruments, and when such a charged body (an operator, a machine, or a testing instrument) touches a LCD panel, elements or circuits in the LCD panel may be damaged by electro static discharge (ESD). An active device array mother substrate can be partitioned into a plurality of active device array substrates through a breaking process. Generally speaking, a first metal line (located on the same layer as scan lines) and a second metal line (located on the same layer as data lines) are formed in the peripheral circuit area of each of the active device array substrates, and adjacent active device array substrates are connected through the first metal lines and the second metal lines. As a result, an ESD dissipation path is formed.

When ESD occurs on an active device array mother substrate, the static charges can be dissipated to the adjacent active device array substrates through the first metal lines and the second metal lines. Accordingly, the impact of ESD is effectively reduced and elements and circuits in the active device array mother substrate can be protected.

It should be noted that in consideration of the circuit layout, the numbers of the first metal lines and the second metal lines for connecting the adjacent active device array substrates are very limited, and the layout space thereof is also restricted by other circuits. Besides, the first metal lines and the second metal lines may be broken due to over exposure during the mask process. As a result, when ESD occurs on the active device array mother substrate, the static charges cannot be effectively dissipated, and elements and circuits in the active device array mother substrate may be damaged by the ESD.

SUMMARY OF THE INVENTION

Accordingly, the present invention is directed to an active device array mother substrate with effective electro static discharge (ESD) protection.

The present invention provides an active device array mother substrate, wherein the active device array mother substrate is suitable for being partitioned into a plurality of active device array substrates. The active device array mother substrate includes a substrate, a plurality of active device arrays, a plurality of common bus lines, at least one first transparent conductive pattern layer, and at least one second transparent conductive pattern layer. The substrate has a plurality of predetermined areas for defining the locations of the active device array substrates. The active device arrays are respectively disposed in the predetermined areas. The common bus lines are respectively disposed in the predetermined areas to surround the active device arrays and to be electrically connected to the active device arrays. The first transparent conductive pattern layer is disposed in each of the predetermined areas and is connected or coupled between the common bus lines in adjacent two predetermined areas. The second transparent conductive pattern layer is disposed in each of the predetermined areas and is extended into the adjacent predetermined area to be connected or coupled to the common bus line in the adjacent predetermined area.

According to an embodiment of the present invention, the first transparent conductive pattern layer is a transparent line.

According to an embodiment of the present invention, the second transparent conductive pattern layer is a transparent line.

According to an embodiment of the present invention, the first transparent conductive pattern layer has two first discharge points disposed opposite and at a distance away from each other.

According to an embodiment of the present invention, the second transparent conductive pattern layer has two second discharge points disposed opposite and at a distance away from each other.

According to an embodiment of the present invention, the active device array mother substrate further includes a first pad, wherein the first pad is disposed in the predetermined area and is electrically connected to the first transparent conductive pattern layer.

According to an embodiment of the present invention, the active device array mother substrate further includes a second pad, wherein the second pad is disposed in the predetermined area and is electrically connected to the second transparent conductive pattern layer.

According to an embodiment of the present invention, the active device arrays further include a plurality of common lines electrically connected to the common bus lines.

According to an embodiment of the present invention, the material of the first transparent conductive pattern layer includes indium tin oxide (ITO), indium zinc oxide (IZO), or aluminum zinc oxide (AZO).

According to an embodiment of the present invention, the material of the second transparent conductive pattern layer includes ITO, IZO, or AZO.

In the present invention, the first transparent conductive pattern layer is connected or coupled between the common bus lines in adjacent two predetermined areas, and the second transparent conductive pattern layer is extended into an adjacent predetermined area to be connected or coupled to the common bus line in the adjacent predetermined area. Thereby, when ESD occurs on the active device array mother substrate, the static charges can be dissipated to the entire substrate through the first transparent conductive pattern layer and/or the second transparent conductive pattern layer, and accordingly the impact of the ESD can be reduced.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF THE EMBODIMENTS

Figure 1A:
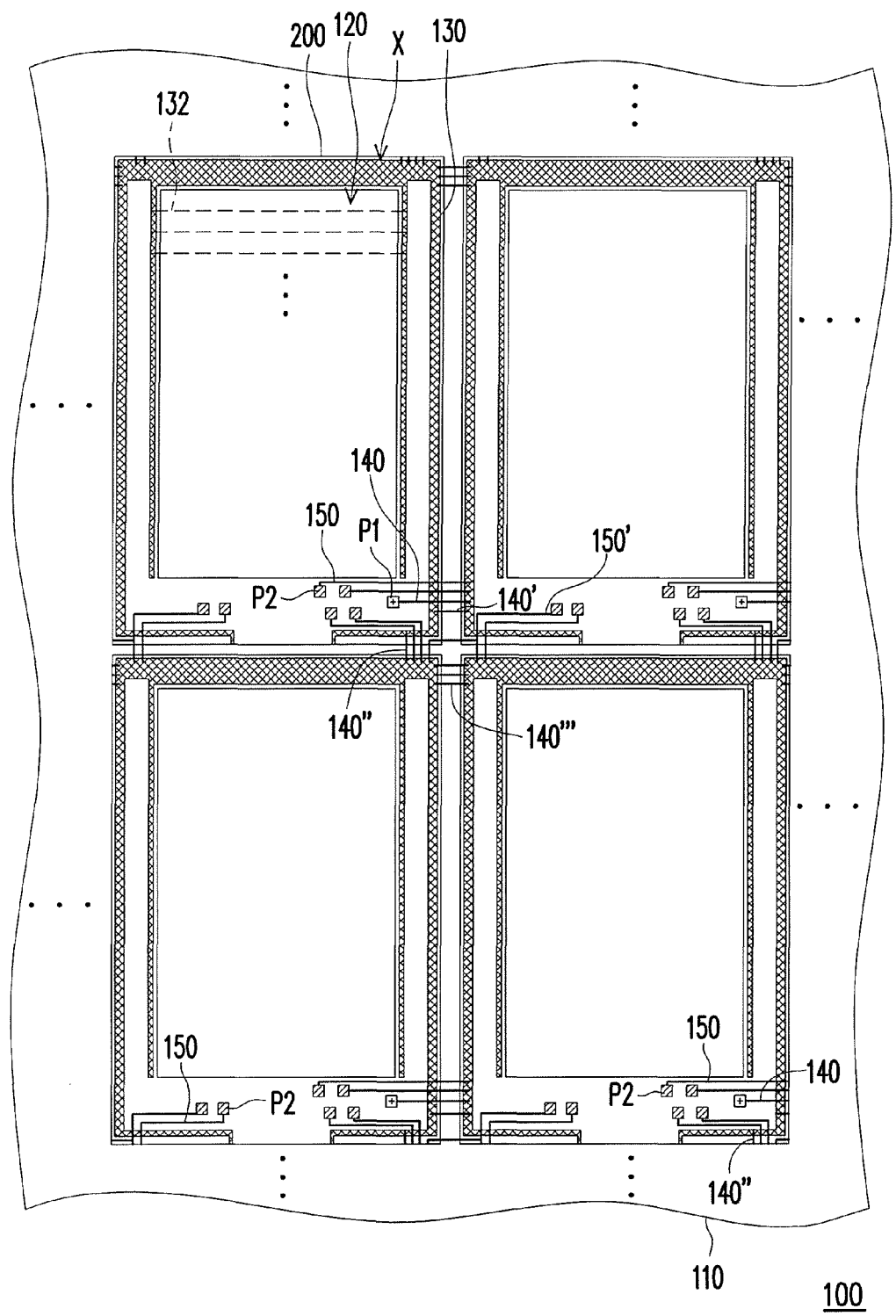
FIG. 1A is a diagram of an active device array mother substrate according to a first embodiment of the present invention.

Reference will now be made in detail to the present preferred embodiments of the invention, examples of which are illustrated in the accompanying drawings. Wherever possible, the same reference numbers are used in the drawings and the description to refer to the same or like parts.

First Embodiment

FIG. 1A is a diagram of an active device array mother substrate according to the first embodiment of the present invention. Referring to FIG. 1A, the active device array mother substrate 100 is suitable for being partitioned into a plurality of active device array substrates 200 (four are illustrated in FIG. 1A) through a breaking process. To be specific, the active device array mother substrate 100 includes a substrate 110, a plurality of active device arrays 120, a plurality of common bus lines 130, at least one first transparent conductive pattern layer 140, and at least one second transparent conductive pattern layer 150. The substrate 110 has a plurality of predetermined areas X (four are illustrated in FIG. 1A; however, the present invention is not limited thereto) for defining the locations of the active device array substrates 200. The common bus lines 130 are respectively disposed in the predetermined areas X to surround the active device arrays 120 in the predetermined areas X. Generally speaking, each of the active device arrays 120 further includes a plurality of common lines 132, and these common lines 132 are extended outward from the active device array 120 and are all electrically connected to the common bus line 130. However, the present invention is not limited thereto, and those having ordinary knowledge in the art would be able to change the pattern of the common bus lines 130 and the common lines 132 according to the actual requirement.

Figure 1B:
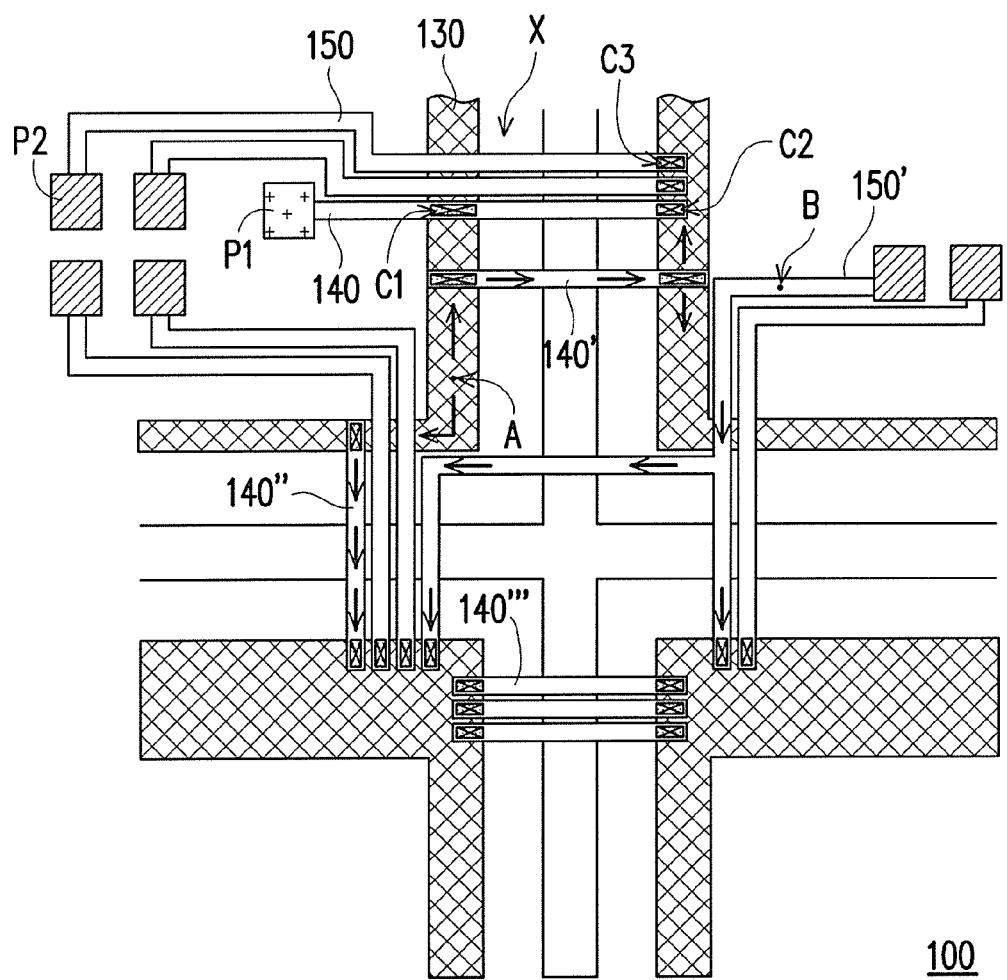
FIG. 1B is a partial enlarged view of the active device array mother substrate in FIG. 1A.

FIG. 1B is a partial enlarged view of the active device array mother substrate in FIG. 1A. Referring to both FIG. 1A and FIG. 1B, the first transparent conductive pattern layer 140 is disposed in each of the predetermined areas X and is connected between the common bus lines 130 in adjacent two predetermined areas X. It should be mentioned here that the first transparent conductive pattern layer 140 may be a transparent line made of indium tin oxide (ITO), indium zinc oxide (IZO), or aluminum zinc oxide (AZO). The first transparent conductive pattern layer 140 may be formed together with the pixel electrodes (not shown) in the active device arrays 120 through the same mask process so that no additional process is required. Substantially, the first transparent conductive pattern layer 140 may be connected between the adjacent two common bus lines 130 through contact windows C1 and C2.

In an embodiment of the present invention, the active device array mother substrate 100 further includes at least one first pad P1, wherein the first pad P1 is disposed in the predetermined area X and is electrically connected to the first transparent conductive pattern layer 140. However, those having ordinary skill in the art would be able to adjust the number and disposed location of the first transparent conductive pattern layer 140 according to the actual requirement, which shall also be construed to be within the scope of the present invention as long as the first transparent conductive pattern layer 140 is connected between adjacent two common bus lines 130, such as the locations of the first transparent conductive pattern layers 140', 140", and 140'''.

On the other hand, the second transparent conductive pattern layer 150 is disposed in each of the predetermined areas X and is extended into the adjacent predetermined area X to be connected to the common bus line 130 in the adjacent predetermined area X. As shown in FIG. 1B, the second transparent conductive pattern layer 150 is not electrically connected to the common bus line 130 in the same predetermined area X. The second transparent conductive pattern layer 150 may be connected to the common bus line 130 in the adjacent predetermined area X through a contact window C3. The second transparent conductive pattern layer 150, the first transparent conductive pattern layer 140, and the pixel electrodes are all formed together through the same mask process. The first transparent conductive pattern layer 140 and the second transparent conductive pattern layer 150 may be transparent lines made of the same material.

According to an embodiment of the present invention, the active device array mother substrate 100 further includes at least one second pad P2, wherein the second pad P2 is disposed in the predetermined area X and is electrically connected to the second transparent conductive pattern layer 150. However, those having ordinary skill in the art would be able to adjust the number and disposed position of the second transparent conductive pattern layer 150 according to the actual requirement, which shall also be construed to be within the scope of the present invention as long as the second transparent conductive pattern layer 150 is connected to the common bus line 130 in the adjacent predetermined area X. Taking the layout of the second transparent conductive pattern layer 150' as an example, the second transparent conductive pattern layer 150' is electrically connected to the two common bus lines 130 below.

Particularly, when electro static discharge (ESD) occurs at the first pad P1 in FIG. 1B, the static charges are dissipated to the common bus lines 130 sequentially through the first transparent conductive pattern layer 140 and the contact window C1. Besides, the static charges may also be dissipated to the common bus lines 130 sequentially through the first transparent conductive pattern layer 140, the contact window C1, and the contact window C2.

When ESD occurs at the position A of the common bus lines 130 as shown in FIG. 1B, the static charges can be dissipated to the common bus lines 130 in the right and the below predetermined areas X respectively through the first transparent conductive pattern layer 140' and the first transparent conductive pattern layer 140".

When ESD occurs at the position B of the second transparent conductive pattern layer 150' as shown in FIG. 1B, the static charges can be dissipated to the common bus lines 130 in the adjacent two predetermined areas X below along the second transparent conductive pattern layer 150'. Accordingly, the static charges can be effectively dissipated into different predetermined areas X, and as a result, the impact of the ESD can effectively reduced.

Since the first transparent conductive pattern layer 140 and the second transparent conductive pattern layer 150 are formed together with the pixel electrodes through the same mask process, the patterns of the first transparent conductive pattern layer 140 and the second transparent conductive pattern layer 150 can be changed by adjusting the mask pattern. It should be noted that according to the conventional technique, the first metal lines and the second metal lines are respectively located on the same layers as the scan lines and the data lines and generally speaking, these layers have very dense circuit layout, thus, it is difficult to change the numbers and layout of the first metal lines and the second metal lines according to the actual requirement. Contrarily, in the present invention, the first transparent conductive pattern layer 140 and the second transparent conductive pattern layer 150 can provide more ESD dissipation paths, and accordingly the impact of ESD can be effectively reduced.

Second Embodiment

Figure 2:
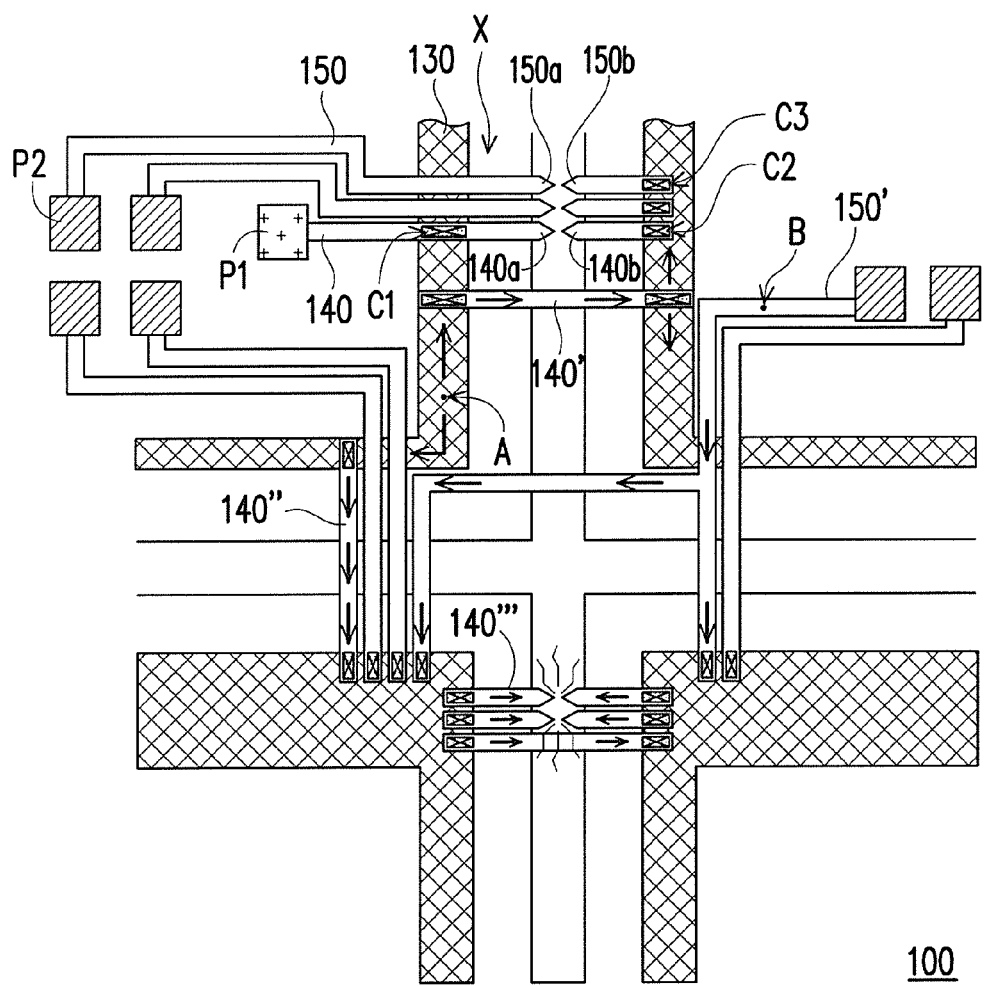
FIG. 2 is a partial enlarged view of an active device array mother substrate according to a second embodiment of the present invention.

The second embodiment is similar to the first embodiment therefore will not be described herein. The difference between the two embodiments is that in the present embodiment, the first transparent conductive pattern layer and the second transparent conductive pattern layer are respectively designed with discharge points. FIG. 2 is a partial enlarged view of an active device array mother substrate according to the second embodiment of the present invention. Referring to FIG. 2, the first transparent conductive pattern layer 140 has two opposite first discharge points 140a and 140b, wherein the first discharge points 140a and 140b are coupled to each other and are disposed at a distance away from each other. On the other hand, the second transparent conductive pattern layer 150 has two opposite second discharge points 150a and 150b, wherein the second discharge points 150a and 150b are coupled to each other and are disposed at a distance away from each other. Accordingly, static charges can be dissipated through the first discharge points 140a and 140b and the second discharge points 150a and 150b, and as a result, the impact of ESD can be effectively reduced.

In overview, according to the present invention, the first transparent conductive pattern layer is connected or coupled between adjacent two common bus lines, and the second transparent conductive pattern layer is extended into the adjacent predetermined area to be connected or coupled to the common bus line in the adjacent predetermined area. Thereby, when ESD occurs on the active device array mother substrate, the static charges can be dissipated to the entire substrate through the first transparent conductive pattern layer and/or the second transparent conductive pattern layer, and accordingly the impact of the ESD can be effectively reduced. Moreover, according to the present invention, the first transparent conductive pattern layer and the second transparent conductive pattern layer have very highly flexibility in their layouts and no additional process for fabricating the first and the second transparent conductive pattern layer is required.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active device array mother substrate, suitable for being partitioned into a plurality of active device array substrates, comprising:
   a substrate, having a plurality of predetermined areas;
   a plurality of active device arrays, respectively disposed in the predetermined areas;
   a plurality of common bus lines, respectively disposed in the predetermined areas to surround the active device arrays and to be electrically connected to the active device arrays;
   at least one first transparent conductive pattern layer, disposed in each of the predetermined areas, wherein the first transparent conductive pattern layer is connected or coupled between the common bus lines in adjacent two of the predetermined areas; and
   at least one second transparent conductive pattern layer, disposed in each of the predetermined areas, wherein the second transparent conductive pattern layer is extended to the adjacent predetermined area to be connected or coupled to the common bus line in the adjacent predetermined area.

2. The active device array mother substrate according to claim 1, wherein the first transparent conductive pattern layer is a transparent line.

3. The active device array mother substrate according to claim 1, wherein the second transparent conductive pattern layer is a transparent line.

4. The active device array mother substrate according to claim 1, wherein the first transparent conductive pattern layer has two first discharge points which are disposed opposite and at a distance away from each other.

5. The active device array mother substrate according to claim 1, wherein the second transparent conductive pattern layer has two second discharge points which are disposed opposite and at a distance away from each other.

6. The active device array mother substrate according to claim 1 further comprising at least one first pad which is disposed in the predetermined area and is electrically connected to the first transparent conductive pattern layer.

7. The active device array mother substrate according to claim 1 further comprising at least one second pad which is disposed in the predetermined area and is electrically connected to the second transparent conductive pattern layer.

8. The active device array mother substrate according to claim 1, wherein each of the active device arrays further comprises a plurality of common lines electrically connected to the common bus line.

9. The active device array mother substrate according to claim 1, wherein the material of the first transparent conductive pattern layer comprises indium tin oxide (ITO), indium zinc oxide (IZO), or aluminum zinc oxide (AZO).

10. The active device array mother substrate according to claim 1, wherein the material of the second transparent conductive pattern layer comprises ITO, IZO, or AZO.

* * * * *